(12) United States Patent  
Tang et al.

(10) Patent No.: US 8,036,937 B2
(45) Date of Patent: Oct. 11, 2011

(54) COMPUTER-IMPLEMENTED METHOD AND SYSTEM FOR ENABLING THE AUTOMATED SELECTION OF KEYWORDS FOR RAPID KEYWORD PORTFOLIO EXPANSION

(75) Inventors: Xiaofeng Tang, San Jose, CA (US); Joel R. Minton, Campbell, CA (US)

(73) Assignee: eBay Inc., San Jose, CA (US)

( * ) Notice: Subject to any disclaimer, the term of this patent is extended or adjusted under 35 U.S.C. 154(b) by 41 days.

(21) Appl. No.: 11/427,097

(22) Filed: Jun. 28, 2006

(65) Prior Publication Data

US 2007/0156757 A1    Jul. 5, 2007

Related U.S. Application Data

(60) Provisional application No. 60/743,058, filed on Dec. 21, 2005, provisional application No. 60/743,059, filed on Dec. 21, 2005, provisional application No. 60/743,060, filed on Dec. 21, 2005.

(51) Int. Cl.
G06F 17/00 (2006.01)

(52) U.S. Cl. ............... 705/14.46; 705/14.4; 705/14.45; 707/722

(58) Field of Classification Search ............. 705/14, 705/14.4, 14.46, 14.45; 707/722
See application file for complete search history.

(56) References Cited

U.S. PATENT DOCUMENTS

| | | | |
|---|---|---|---|
| 6,499,030 B1 | 12/2002 | Igata | |
| 6,704,727 B1 | 3/2004 | Kravets | |
| 6,826,572 B2 | 11/2004 | Colace et al. | |
| 6,876,997 B1 | 4/2005 | Rorex et al. | |
| 7,007,014 B2* | 2/2006 | Liu et al. | 707/3 |
| 7,225,182 B2* | 5/2007 | Paine et al. | 707/3 |
| 7,752,190 B2 | 7/2010 | Skinner | |
| 7,792,858 B2 | 9/2010 | Tang et al. | |
| 2002/0013763 A1 | 1/2002 | Harris | |
| 2002/0038241 A1 | 3/2002 | Hiraga | |
| 2002/0038282 A1 | 3/2002 | Mongomery | |
| 2002/0072895 A1 | 6/2002 | Imanaka et al. | |
| 2002/0111847 A1* | 8/2002 | Smith, II | 705/10 |
| 2002/0116313 A1 | 8/2002 | Detering | |
| 2002/0128949 A1 | 9/2002 | Wiesehuegel et al. | |
| 2002/0188694 A1 | 12/2002 | Yu | |
| 2003/0055729 A1 | 3/2003 | Bezos et al. | |
| 2003/0055816 A1 | 3/2003 | Paine et al. | |
| 2003/0088525 A1 | 5/2003 | Velez et al. | |
| 2003/0105677 A1 | 6/2003 | Skinner | |
| 2003/0220918 A1 | 11/2003 | Roy et al. | |

(Continued)

OTHER PUBLICATIONS

U.S. Appl. No. 11/517,886 Response filed Oct. 9, 2008 to Non-Final Office Action mailed Jun. 9, 2008, 14 pgs.

(Continued)

*Primary Examiner* — Mahesh Dwivedi
(74) *Attorney, Agent, or Firm* — Schwegman, Lundberg & Woessner, P.A.

(57) ABSTRACT

A computer-implemented method and system for enabling the automated selection of keywords for rapid keyword portfolio expansion are disclosed. Various embodiments are operable to normalize a plurality of keywords received from a source, filter the normalized plurality of keywords against one or more keyword filtration lists, produce site-specific variants of the filtered plurality of keywords, associate at least one level of dimension data with each of the plurality of keywords, and store the processed plurality of keywords and dimension data in a keyword database.

24 Claims, 5 Drawing Sheets

U.S. PATENT DOCUMENTS

| | | | |
|---|---|---|---|
| 2004/0068460 | A1 | 4/2004 | Feeley et al. |
| 2004/0088241 | A1 | 5/2004 | Rebane et al. |
| 2004/0199496 | A1 | 10/2004 | Liu et al. |
| 2004/0230574 | A1 | 11/2004 | Kravets |
| 2005/0065844 | A1 | 3/2005 | Raj et al. |
| 2005/0071325 | A1 | 3/2005 | Bem |
| 2005/0097024 | A1 | 5/2005 | Rainey |
| 2005/0137939 | A1 | 6/2005 | Calabria et al. |
| 2005/0144064 | A1* | 6/2005 | Calabria et al. ............. 705/14 |
| 2005/0144065 | A1 | 6/2005 | Calabria et al. |
| 2005/0223000 | A1 | 10/2005 | Davis et al. |
| 2005/0228797 | A1 | 10/2005 | Koningstein et al. |
| 2006/0004628 | A1 | 1/2006 | Axe et al. |
| 2006/0069784 | A2 | 3/2006 | Hsu et al. |
| 2006/0149623 | A1* | 7/2006 | Badros et al. ............. 705/14 |
| 2006/0206516 | A1* | 9/2006 | Mason ..................... 707/102 |
| 2007/0027754 | A1* | 2/2007 | Collins et al. ............. 705/14 |
| 2007/0143266 | A1 | 6/2007 | Tang et al. |
| 2007/0162379 | A1 | 7/2007 | Skinner |
| 2010/0318568 | A1 | 12/2010 | Tang et al. |
| 2011/0010263 | A1 | 1/2011 | Skinner |

OTHER PUBLICATIONS

U.S. Appl. No. 11/517,886 Final Office Action mailed Feb. 6, 2009, 12 pgs.

U.S. Appl. No. 11/427,090, Non-Final Office Action mailed Apr. 1, 2009, 17 pgs.

U.S. Appl. No. 11/427,090, Response filed Aug. 3, 2009 to Non Final Office Action mailed Apr. 1, 2009, 14 pgs.

U.S. Appl. No. 11/517,886, Non-Final Office Action mailed Aug. 6, 2009, 12 Pgs.

U.S. Appl. No. 11/517,886, Response filed Jun. 8, 2009 to Final Office Action mailed Feb. 6, 2009, 13 pgs.

"U.S. Appl. No. 11/517,886, Notice of Allowance mailed Feb. 22, 2010", 8 pgs.

"U.S. Appl. No. 11/517,886, Response filed Nov. 6, 2009 to Non Final Office Action mailed Aug. 6, 2009", 12 pgs.

"U.S. Appl. No. 11/427,090, Final Office Action mailed Nov. 4, 2009", 17 pgs.

"U.S. Appl. No. 11/427,090, Notice of Allowance mailed Apr. 30, 2010", 10.

"U.S. Appl. No. 11/427,090, Response filed Mar. 4, 2010 to Final Office Action mailed Nov. 4, 2009", 12 pgs.

"U.S. Appl. No. 11/517,886 Non-Final Office Action mailed Jun. 9, 2008", OARN, 16 Pgs.

"U.S. Appl. No. 12/830,193, Final Office Action mailed Nov. 19, 2010", 12 pgs.

"U.S. Appl. No. 12/860,564, Preliminary Amendment filed Sep. 14, 2010", 7 pgs.

"U.S. Appl. No. 12/830,193, Non Final Office Action mailed May 13, 2011", 9 pgs.

"U.S. Appl. No. 12/830,193, Response filed Apr. 19, 2011 to Final Office Action mailed Nov. 19, 2010", 10 pgs.

* cited by examiner

| keyword | Global Dimensions | | | | | | | Source Specific | | | | | Traffic | | Clustering | |
|---|---|---|---|---|---|---|---|---|---|---|---|---|---|---|---|---|
| | Yahoo volume | Host site volume | # host site search results | aff kw? | international kw? | natural kw? | etc. | affiliate ID | which country | country revenue | country cost | etc. | trafficked | cpc | Category Affinity | VCRU by kw |
| keyword 1 | 100 | 50 | 200 | 1 | | 1 | | 123 | na | na | na | na | | | | |
| keyword 2 | 3 | 0 | 3 | | | | | na | na | na | na | na | | | | |
| etc. | | | | | | | | | | | | | | | | |

*Figure 5*

COMPUTER-IMPLEMENTED METHOD AND SYSTEM FOR ENABLING THE AUTOMATED SELECTION OF KEYWORDS FOR RAPID KEYWORD PORTFOLIO EXPANSION

CROSS-REFERENCE TO RELATED PATENT APPLICATIONS

This patent application is related to pending U.S. patent application, Ser. No. 11/427,090, filed on Jun. 28, 2006 and assigned to the same assignee as the present patent application.

This patent application is related to pending U.S. patent application, Ser. No. 11/517,886, filed on Sep. 8, 2006 and assigned to the same assignee as the present patent application.

This patent application claims the benefit of priority, under 35 U.S.C. Section 119(e), of U.S. Provisional Patent Application Ser. No. 60/743,058, filed on Dec. 21, 2005, and titled, "A Computer-implemented Method and System for Combining Keywords Into Logical Clusters that Share Similar Behavior With Respect to a Considered Dimension", and assigned to the same assignee as the present patent application.

This patent application claims the benefit of priority, under 35 U.S.C. Section 119(e), of U.S. Provisional Patent Application Ser. No. 60/743,059, filed on Dec. 21, 2005, and titled, "A Computer-implemented Method and System for Enabling the Automated Selection of Keywords for Rapid Keyword Portfolio Expansion", and assigned to the same assignee as the present patent application.

This patent application claims the benefit of priority, under 35 U.S.C. Section 119(e), of U.S. Provisional Patent Application Ser. No. 60/743,060, filed on Dec. 21, 2005, and titled, "A Computer-implemented Method and System for Managing Keyword Bidding Prices", and assigned to the same assignee as the present patent application.

BACKGROUND

1. Technical Field

This disclosure relates to methods and systems supporting keyword advertising associated with Internet search engine usage and keyword query submittal by a user. More particularly, the present disclosure relates to automated bidding for search keywords.

2. Related Art

An increasingly popular way of delivering Internet advertisements is to tie the advertisement to search query results triggered by the entry of particular keywords (e.g. search queries) by a user. In order to target advertising accurately, advertisers or vendors pay to have their advertisements presented in response to certain kinds of queries—that is, their advertisements are presented when particular keyword combinations are supplied by the user of the search engine.

For example, when a user searches for "baseball cards," using a search engine such as Google or other well-known search engines, in addition to the usual query results, the user may also be shown a number of sponsored results. These may be paid advertisements for businesses, generally offering related goods and/or services. In this example, the advertisements may therefore be directed to such things as baseball card vendors, collectibles shops, sports memorabilia, or even sporting goods or event tickets. Of course, the advertisements may be directed to seemingly less related subject matter. While the presentation varies somewhat between search engines, these sponsored results are usually shown a few lines above, or on the right hand margin of the regular results. Although, the sponsored results may also be placed anywhere in conjunction with the regular results.

Keyword advertising is growing as other types of web advertising are generally declining. It is believed there are at least several features that contribute to its success. First, sponsored results are piggybacked on regular results, so they are delivered in connection with a valuable, seemingly objective, service to the user. By contrast, search engines that are built primarily on sponsored results have not been as popular. Second, the precision of the targeting of the advertising means the user is more likely to find the advertisements useful, and consequently may perceive the advertisements as more of a part of the service than as an unwanted intrusion. Unlike banners and pop-up advertisements, which are routinely ignored or dismissed, users appear more likely to click through these sponsored results (e.g., keyword advertisements). Third, the targeting is based entirely on the current query, and not on demographic data developed over longer periods of time. This kind of targeting is timelier and more palatable to users with privacy concerns. Fourth, these advertisements reach users when they are searching, and therefore when they are more open to visiting new web sites.

Companies, such as Google of Mountain View, Calif., which offers a search engine and Overture of Pasadena, Calif. (now Yahoo Search), which aggregates advertising for search engines as well as offering its own search engine, use an auction mechanism combined with a pay-per-click (PPC) pricing strategy to sell advertising. This model is appealing in its simplicity. Advertisers bid in auctions for placement of their advertisements in connection with particular keywords or keyword combinations. The amount they bid (e.g., cost-per-click (CPC)) is the amount that they are willing to pay for a click-through on their link. For example, in one PPC pricing strategy, if company A bids $1.10 for the keyword combination "baseball cards", then its advertisement may be placed above a company bidding $0.95 for the same keyword combination. Only a selected number of bidders' advertisements may be shown. The simplicity of the model makes it easy for an advertiser to understand why an advertisement is shown, and what bid is necessary to have an advertisement shown. It also means that advertisers are charged only for positive click-through responses.

Both Google and Overture offer tools to help users identify additional keywords based on an initial set of keywords. The Overture model supplies keywords that actually contain the keyword (e.g. for bicycle one can get road bicycle, Colonago bicycle, etc.). Google, on the other hand, performs some kind of topic selection, which they claim is based on billions of searches.

Both Google and Overture offer tools to help users manage their bids. Google uses click-through rate and PPC to estimate an expected rate of return which is then used to dynamically rank the advertisements. Overture uses the PPC pricing strategy to rank advertisements, but monitors the click-through rate for significantly under performing advertisements.

Because Google dynamically ranks the advertisements based on click-through and PPC, advertisers cannot control their exact advertisement position with a fixed PPC. To insure a top position, the advertiser may be willing to pay a different price that is determined by their own click through rate as well as the competitors click-though rates and PPC. Overture uses a fixed price model, which insures fixed position for fixed price.

If a set of keywords that have not been selected by any of the advertisers is issued as a search term, Google may attempt to find the best matching selected set of keywords and display its associated advertisements. For example, let's say a user searches on "engagement ring diamond solitaire." However, there are no advertisers bidding on this search term. The expanded matching feature may then match (based on term, title, and description) selected listings from advertisers that have bid on search terms (e.g. keyword combinations) like "solitaire engagement ring" and "solitaire diamond ring."

A number of third parties provide services to Overture customers to identify and select keywords and track and rank bids. For example, BidRank, Dynamic Keyword Bid Maximizer, Epic Sky, GoToast, PPC BidTracker, PPC Pro, Send Traffic, and Sure Hits. There are a small number of pay-per-bid systems. For example, Kanoodle is a traditional pay-per-bid system like Overture. Other examples, include Sprinks and FindWhat.

The Sprinks brand system, ContentSprinks™, produces listings that rely on context, as opposed to one-to-one matching with a keyword. The user chooses topics, rather than keywords. The Sprinks web site asserts, "Since context is more important than an exact match, you can put your offer for golf balls in front of customers who are researching and buying golf clubs, and your listing may still be approved, even though it's not an exact match." This is a pay-per-bid model, like Overture, and has been used by About.com, ivillage.com and Forbes.com. The Sprinks brand system, Keyword-Sprinks™, is a traditional pay-per-bid model for keywords and phrases.

FindWhat has a BidOptimizer that shows the bids of the top five positions so that a user can set their bid price for a keyword to be at a specific position. It does not continually adjust bids like Google and Overture.

In addition, there is a system called Wordtracker for helping users to select keywords. The Wordtracker system at <www.wordtracker.com> provides a set of tools to help users to identify keywords for better placement of advertisements and web pages in search engines, both regular and pay-per-bid. Wordtracker provides related words with occurrence information, misspelled word suggestions based on the number of occurrences of the misspelled words, and tools for keeping track of possible keyword/key phrase candidates. The related words are more than variants. On the web site, an example of related keywords for "golf" includes pga, Ipga, golf courses, tiger woods, golf clubs, sports, jack nicklaus, and titleist, as well as phrases that include the term "golf," such as golf clubs, golf courses, golf equipment, used golf clubs, golf tips, golf games, and vw.golf. Wordtracker displays the bid prices for a keyword on selected pay-per-bid search engines. It also displays the number of occurrences of search terms by search engine so the keywords can be tuned to each search engine.

Wordtracker can be a useful tool, but it does not automate certain aspects of the advertiser's decision-making, bidding, and placement of advertisements. Currently, an advertiser may participate in every auction of relevant keywords. In the example above, a company offering sporting goods may want its advertisements to be placed with a variety of keywords corresponding to common queries related to sports equipment, training, events, etc. These keywords vary in their relevance to the company's business, in their "yield" of productive click-through visits to the company's web site, and their cost to the company (based on competition in the auctions). The multiplicity of keyword combinations and the multiplicity of considerations for each keyword combination create a number of opportunities for automation support mechanisms for advertisement placement decision making.

In the process of bidding in keyword auctions, advertisers may compete in ways that are mutually detrimental. There may be better joint strategies that are less costly, or involve alternative keywords, but the individual bidders do not easily discover these joint strategies. Even when the individual bidders know good joint strategies, the individual bidders may not have a strong incentive to pursue these strategies without some assurance of cooperation.

If the process of selecting and bidding for keyword combinations for an advertiser was automated or more automated, it likely that less guidance would be required from the advertiser and that advertisements would be placed on more effective keywords. It is also likely that such automation would help maximize return on advertising investment (ROAI), increase the number sponsored keywords, and maximize click-through rates for keyword advertisements.

Several published U.S. patent applications disclose concepts related to bidding for a position of a keyword advertisement in a search results list. For example, U.S. Patent Application Pub. No. U.S. 2005/0144064 A1 discloses a method of generating a bid for an advertiser for placement of an advertisement in association with a search results list, where the search results list is generated in response to a search query. In one embodiment, the method includes: a) associating the at least one keyword with the bid, wherein the search query is associated with the at least one keyword, and b) determining an amount of the bid, associated with the at least one keyword, for placement of the advertisement in association with the search results list generated in response to the search query associated with the at least one keyword. The bid is determined based at least in part on bids by other advertisers in competition with the first advertiser for placement of other advertisements with an expectation that the determined bid may elicit a desired change in the bids by the other advertisers.

U.S. Patent Application Pub. No. U.S. 2005/0144065 A1 discloses a method of coordinating one or more bids for one or more groups of advertisers for placement of at least one advertisement in association with a search results list. The search results list is generated in response to a search query. The method includes: a) collecting information from at least two advertisers in the advertiser group and b) devising a joint strategy for the advertiser group for bidding in the keyword auction. In another embodiment, a method of generating a bid for a first advertiser for placement of a first advertisement in association with a search results list is provided. In another embodiment, an apparatus for generating the bid for the first advertiser is provided. Is still another embodiment, a method of coordinating bids from a first advertiser and a second advertiser for placement of at least one advertisement in association with a first search results list is provided.

U.S. Patent Application Pub. No. U.S. 2005/0071325 A1 discloses a system wherein the number of ads potentially relevant to search query information may be increased by relaxing the notion of search query keyword matching. This may be done, for example, by expanding a set of ad request keywords to include both query keywords (or derivatives of a root thereof) and related keywords. The related keywords may be words with a relatively high co-occurrence with a query keyword in a group of previous search queries (e.g., search queries in a session). The scores of ads with keyword targeting criteria that matched words related to words in a search query, but not the words from the search query, may be discounted. That is, the scores of ads served pursuant to a relaxed notion of matching may be discounted relative to the scores of ads served pursuant to a stricter notion of matching. This may be done by using a score modification parameter, such as an ad performance multiplier (for cases in which an ad score is a function of ad performance information). The score modification parameter may be updated to reflect observed performance data, such as performance data associated with {word-to-related word} mappings.

U.S. Patent Application Pub. No. U.S. 2005/0137939 A1 discloses a server-based method of automatically generating a plurality of bids for an advertiser for placement of at least one advertisement in association with a search results list. The method includes: a) receiving at least one candidate advertisement, b) creating a list of candidate keywords, c) estimating a click-through rate for each advertisement-keyword pair, d) calculating a return on advertising investment (ROAI) for each advertisement-keyword pair, and e) calculating a bid amount for each advertisement-keyword pair. In another aspect, a server-based method of generating a bid for placement of an advertisement in association with a search results list is provided. In other aspects, a method of selecting one or more keywords in conjunction with the bid is provided as well as a method of determining a return on advertising investment (ROAI) information for an advertiser in conjunction with the bid is provided.

U.S. Patent Application Pub. No. U.S. 2004/0088241 A1 discloses a "Keyword Automated Bidding System" (KABS) which, among other things, provides an intelligent system for bidders for a ranking in web search results list to determine bids and bidding strategies that maximize return on bid investments and help direct allocation of available funds for bids to keywords that lead to more optimal returns. An example embodiment is designed to generate a scalable solution to the problem of selecting the proper set of keywords to bid and the proper values of such bids for thousands of keywords on third party sites such as Overture and Google.com. The scalable solution is generated according to operator-defined model constraints and utility functions. In one embodiment, KABS maximizes profit by maximizing the Margin Rate to a bidder which is the difference in the aggregate Revenue per Redirect (RPR) from the merchants and the Cost per Click (CPC) that may be paid to the traffic source. The prime constraint on this solution is the total CPC dollar amount that is budgeted over a fixed interval of time (day, week, etc.). A major computational subsystem of KABS performs the estimation of arrival or click-thru rates for each keyword or category of keywords as a function of their display ranks on the source site. It is the form and level of this estimated function that is critical in the selection of the proper display rank from an active bid table a spider retrieves for each keyword. The KABS operator may be required to provide the inputs that direct and constrain the system's operation. Among these is the comprehensive set of keywords of interest from which the proper subset may be computed. Other key inputs include the frequencies of executing the various KABS from re-computing the arrival functions to regeneration of the bid set of keywords along with their corresponding bids and display ranks.

U.S. Patent Application Pub. No. U.S. 2004/0068460 A1 discloses a method and system enabling advertisers to achieve a desired ordinal position of a web page link in a list of search results generated by a bid-for-position search engine on the Internet in response to a keyword search. The method involves surveying other bid-for-position search engines to collect available bid data, determining a network high bid amount for a keyword of interest and the desired position, and adjusting the advertiser's bid on the keyword to be at least as much as the network high bid amount for that keyword and desired position.

U.S. Patent Application Pub. No. U.S. 2003/0088525 A1 discloses a method and apparatus (information processing system) for overcoming deficiencies and inefficiencies in the current paid search engine keyword bidding market, by providing keyword bidders with information they need to better optimize their use of paid search engines. The system accumulates bid amounts for a plurality of target keywords at one or more paid Internet search engines, and presents the bid amounts to a user, enabling the user to evaluate and optimize bids on those keywords. The system also presents bid amounts for a keyword at one or more paid Internet search engines, in a manner highlighting one or more selected bid amounts of interest to a potential bidder. This permits a bidder to identify the bidder's own bid, and/or to identify a differential in bid amounts that indicates an opportunity for bid optimization. The system further monitors keyword bids at one or more paid Internet search engines to identify bid changes of interest to a potential bidder.

U.S. Patent Application Pub. No. U.S. 2003/0055729 A1 discloses a method and system for allocating display space on a web page. In one embodiment, the display space system receives multiple bids each indicating a bid amount and an advertisement. When a request is received to provide a web page that includes the display space, the display space system selects a bid based in part on the bid amount. The display space system then adds the advertisement of the selected bid to the web page. The bid may also include various criteria that specify the web pages on which the advertisement may be placed, the users to whom the advertisement may be presented, and the time when the advertisement may be placed. The bid amount may be a based on an established currency or based on advertising points. The display space system may award advertising points for various activities that users perform. The activities for which advertising points may be awarded may include the listing of an item to be auctioned, the bidding on an item being auctioned, the purchasing of an item at an auction, or the purchasing of an item at a fixed price. The display space system tracks the advertising points that have been allocated to each user. When an advertisement is placed on a web page on behalf of the user, the display space system reduces the number of advertising points allocated to that user. The display space system may also provide an auto bidding mechanism that places bids for display space on behalf of the user.

U.S. Patent Application Pub. No. U.S. 2003/0055816 A1 discloses a pay-for-placement search system that makes search term recommendations to advertisers managing their accounts in one or more of two ways. A first technique involves looking for good search terms directly on an advertiser's web site. A second technique involves comparing an advertiser to other, similar advertisers and recommending the search terms the other advertisers have chosen. The first technique is called spidering and the second technique is called collaborative filtering. In the preferred embodiment, the output of the spidering step is used as input to the collaborative filtering step. The final output of search terms from both steps is then interleaved in a natural way.

U.S. Patent Application Pub. No. U.S. 2003/0105677 A1 discloses an automated web ranking system which enables advertisers to dynamically adjust pay-per-click bids to control advertising costs. The system tracks search terms which are used to market an advertiser's product or services in on-line marketing media ("OMM"). The system determines the search term's effectiveness by collecting and analyzing data relating to the number of impressions, the number of clicks, and the number of resulting sales generated by a search term at a given time period. Based on the data collected and parameters which the advertiser provides relating to the advertiser's economic factors, the system calculates a maximum acceptable bid for each search term. The system monitors the web for competitor's bids on an advertiser's search term and places bids which fall below the maximum acceptable bid.

United States Patent Application No. 2005/0223000 discloses a system and method for enabling information providers using a computer network to influence a position for a search listing within a search result list. A database stores accounts for the network information providers. Each account contains contact and billing information. In addition, each account contains at least one search listing having at least three components: a description, a search term comprising one or more keywords, and a bid amount. The network information provider may add, delete, or modify a search listing after logging into his or her account via an authentication process. The network information provider influences a position for a search listing in the provider's account by first selecting a relevant search term and entering that search term and the description into a search listing. A continuous online competitive bidding process occurs when the network information provider enters a new bid amount for a search listing. This bid amount is compared with all other bid amounts for the same search term. A rank value is generated for all search listings having that search term. The generated rank value determines where the network information provider's listing may appear on the search results list page that is generated in response to a query of the search term by a searcher at a client computer on the computer network. A higher bid by a network information provider may result in a higher rank value and a more advantageous placement.

United States Patent Application No. 2005/0065844 discloses a system and method for automating the management of an advertising campaign for a sponsored search application. An advertiser can easily manage their advertising campaign based on a budget and other information that they are most familiar with, e.g., the length of time for the campaign, desired number of total clicks during the campaign, the time zone of the campaign, keywords to be bid upon for the sponsored search application, the advertisement (copy and heading), and the URL associated with the location of the advertisement copy. With this relatively basic information provided, an example embodiment can automatically manage the bidding on both small and relatively large numbers of keywords for an advertising campaign.

United States Patent Application No. 2004/0230574 discloses a method and system for providing a set of search terms in response to a user input. A first set of search terms is selected from a master set of search terms based upon a match between the input and the search terms or based upon a predefined association between the input and the search terms. A second set of search terms is selected from the first set of search terms in response to a value score that is established for each of the search terms. The value score is selected based at least in part upon the amount of revenue that each search term generates for the system's operator.

United States Patent Application No. 2004/0199496 discloses a presentation system accepts presentations or references to presentations from prospective presenters. Some or all of the presentations or references are stored in a database and referenced by keywords such that presentations to be presented in response to particular searches can be identified. A presentation manager handles accepting bids and settling terms between prospective presenters. The results of such processes might be stored in a presentation details database. A presentation server handles retrieving presentations from the presentation details database for presentation to users along with requests such as search results. Both the presentation manager and the presentation server can operate on a keywords-basis, wherein presentation terms specify keywords to be associated with particular presentations and the presentation server serves particular presentations based on keywords in a search query for which the presentations are to be returned. The association of keywords can be done using canonicalization so that, under certain conditions, different keywords are treated as the same keyword. Canonicalizations might include plural/singular forms, gender forms, stem word forms, suffix forms, prefix forms, typographical error forms, word order, pattern ignoring, acronyms, stop word elimination, etc. Conditions might include aspects of the search query state, such as the user's demographics, the page from which the search query was initiated, etc.

U.S. Pat. No. 6,826,572 describes a system for advertisers to efficiently manage their search listings in placement database search system includes grouping means for managing multiple categories for the search listings and query means for searching search listings. The system further includes quick-fill means for modifying an attribute in a plurality of search listings by specifying the modification at a single location. The system provides a method and system for a pay for placement database search system. The method and system include grouping and querying, one or more search listings associated with an advertiser, and providing the advertisers an ability to simultaneously modify a plurality of search listings. The advertisers also possess means to search the categories and gather statistical data for an entire category.

U.S. Pat. No. 6,704,727 describes a method and system for providing a set of search terms in response to a user input. A first set of search terms is selected from a master set of search terms based upon a match between the input and the search terms or based upon a predefined association between the input and the search terms. A second set of search terms is selected from the first set of search terms in response to a value score that is established for each of the search terms. The value score is selected based at least in part upon the amount of revenue that each search term generates for the system's operator.

U.S. Pat. No. 6,876,997 discloses a method of generating a search result list and also provides related searches for use by a searcher. Search listings which generate a match with a search request submitted by the searcher are identified in a pay for placement database which includes a plurality of search listings. Related search listings contained in a related search database generated from the pay for placement database are identified as relevant to the search request. A search result list is returned to the searcher including the identified search listings and one or more of the identified search listings.

Thus, a computer-implemented method and system for enabling the automated selection of keywords for rapid keyword portfolio expansion are needed.

BRIEF DESCRIPTION OF THE DRAWINGS

Embodiments illustrated by way of example and not limitation in the figures of the accompanying drawings, in which:

FIG. 5 illustrates an example of the metrics processed by the keyword aggregator of one embodiment.

DETAILED DESCRIPTION

Figure 1:
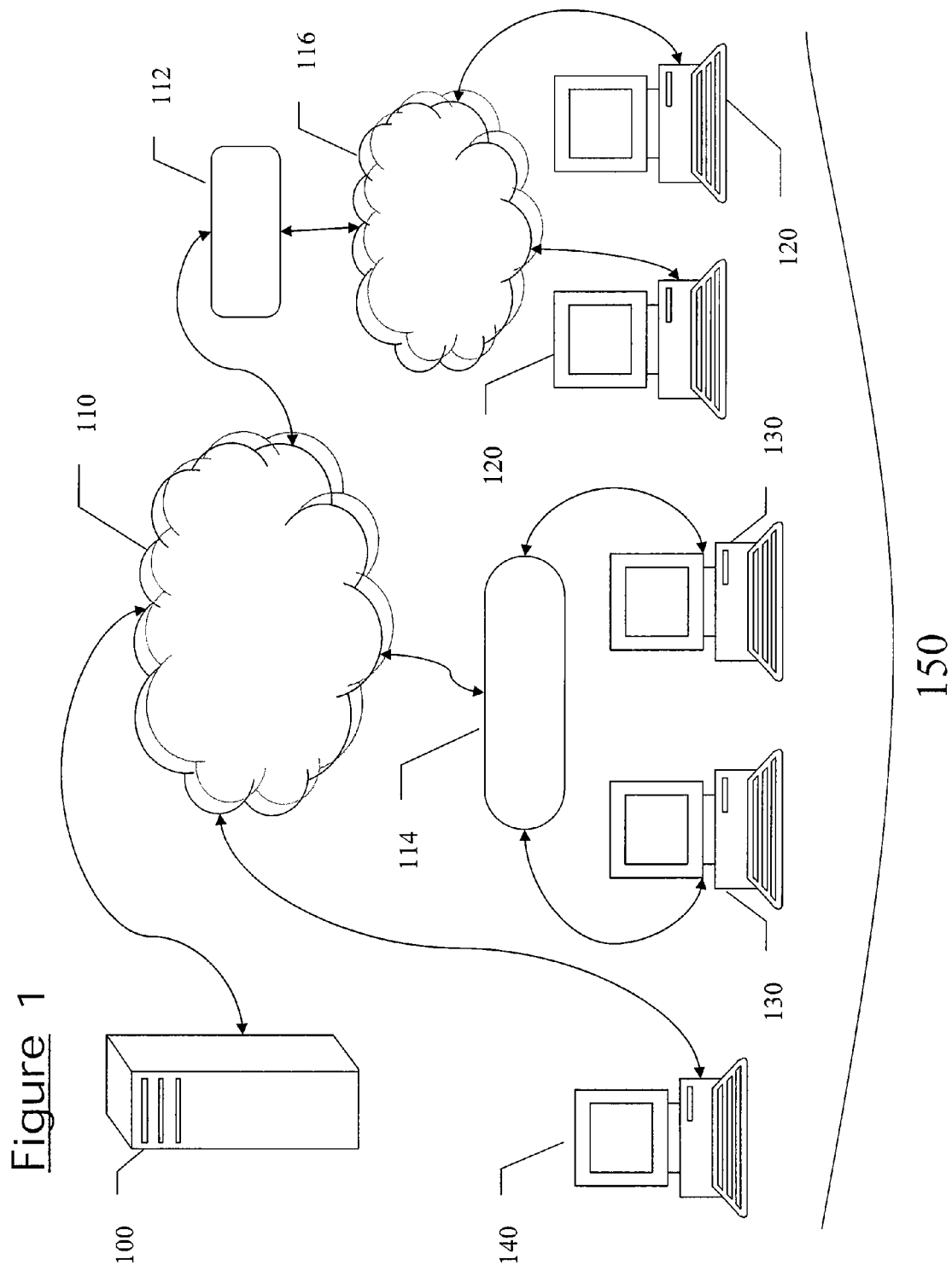
FIG. 1 is a block diagram of a network system on which an embodiment may operate.

A computer-implemented method and system for enabling the automated selection of keywords for rapid keyword portfolio expansion are disclosed. In the following description, numerous specific details are set forth. However, it is understood that embodiments may be practiced without these specific details. In other instances, well-known processes, structures and techniques have not been shown in detail in order not to obscure the clarity of this description.

Various example embodiments of a computer-implemented method, article of manufacture, and system including a Keyword Selection Module, various embodiments of which are describe herein, enable the automated selection of keywords (denoted herein as KW) for rapid keyword portfolio expansion. Keyword selection is based on a variety of concepts, for example: (1) defined keywords criteria/metrics (e.g., keyword source, clicks, etc); (2) keyword clustering (e.g., defining a cluster for which a keyword's affinity for being included can be calculated) and ad hoc grouping (e.g., utilizing selection criteria to group keywords together). The power of the Keyword Selection Module of an example embodiment comes in part from the fact that the Keyword Selection Module centralizes both the predictive and actual keyword performance data in a single repository (e.g. the Keyword DataMart) that provides the automated and rapid expansion of a paid search keyword portfolio. Another differentiator in this technology is the fact that users who manage the paid search portfolios are able to harvest this rich set of data in huge volume. It is expected that there may be more than 10 M new keywords to select from for adding to the keyword portfolio, as well as optimizing existing keywords. Many new keywords are based on the performance metrics of existing keywords that fall into similar "clusters". The computer-implemented method and system provide functionality to select the keywords with the highest projected revenue per click (RPC) to add to a keyword portfolio across multiple search partners. Keyword expansion and the ability to identify, select, and predict performance of large numbers of new keywords is an aspect of paid search management that many companies struggle with. The computer-implemented method and system, its Keyword Selection Module and its Keyword Datamart or database (KWDM) provide companies a significant competitive advantage in this aspect, among others.

Keyword DataMart (KWDM)—A single unified corpus for capturing all Keywords (trafficked and untrafficked) and related metrics.
  Keyword Selection Module—An application wherein a user can specify criteria and generate lists of keywords to be trafficked based on many different metrics within the KWDM.
  Auto Trafficking Engine—An automation engine which automatically traffics keywords on various search engines based on many metrics, such as query volume, bid volume, and pop culture.

The Keyword Testing Complex

The Keyword Testing Complex is a shorthand name for the sourcing, selecting, adding, reporting, and deleting keywords cycle. One advantage of this functionality, as described in detail below, is to facilitate the adding of good keywords and deleting of bad ones, provide control and reporting so users can easily run tests to determine the heuristics that matter in keyword selection and retention, and enable the automation of as much of the keyword testing, selection, and retention cycle as possible.

Figure 3:
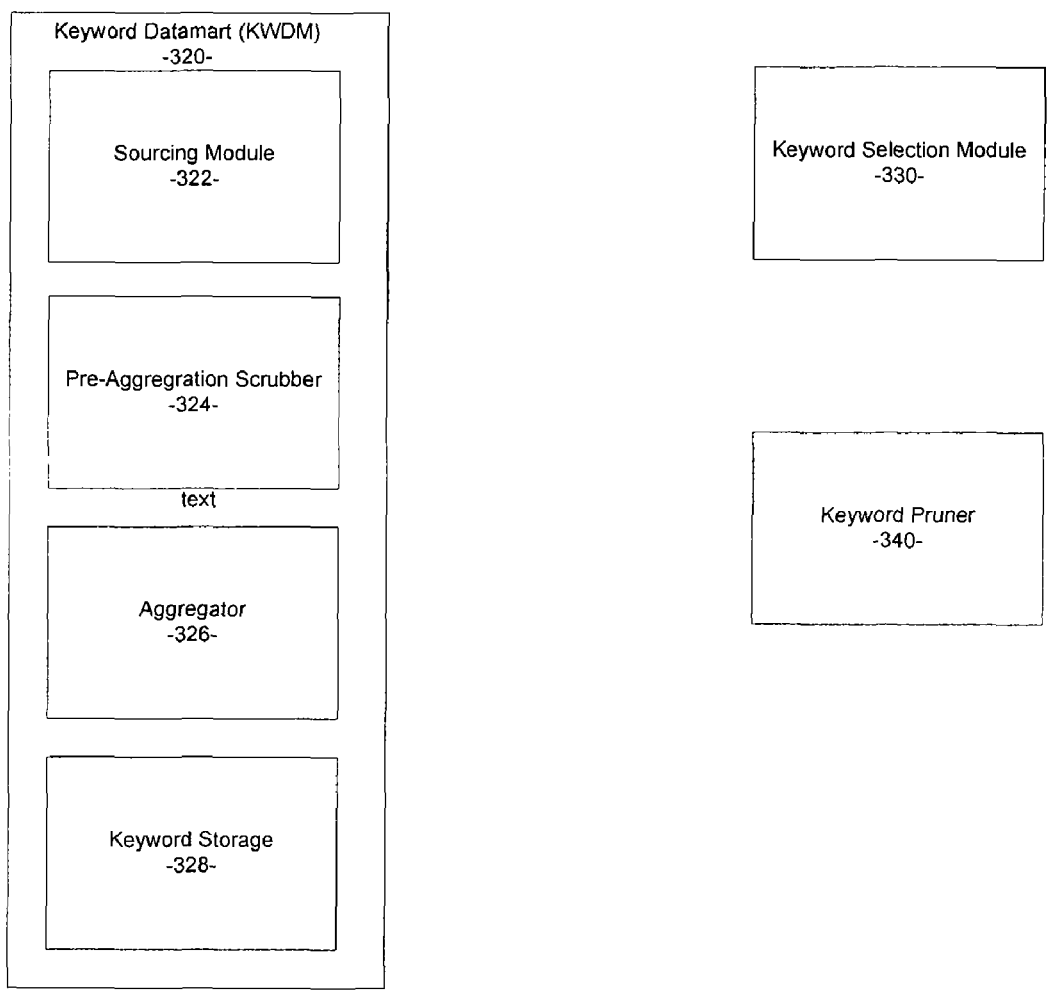
FIG. 3 illustrates the structure and components of the Keyword Testing Complex of one embodiment.

Referring to FIG. 3, a diagram illustrates the main components of the keyword test complex, according to an example embodiment. The keyword test complex 310 includes a keyword datamart, 320, a keyword selection module 330, and a keyword pruning module 340. The keyword data mart, 320 includes a sourcing module 322, a pre-aggregation scrubber 324, an aggregator 326, and keyword storage 328. The components of one embodiment of keyword datamart 320 are described in detail below.

Sourcing Module

The Keyword Sourcing Module 322 regularly pulls in keyword data from various internal and external sources that have been identified as potential sources of potentially revenue-generating keywords. Because each data source may have different dimensions and attributes, a generic and extensible data model is required. It is unlikely that many configurations settings or controls may be required to support keyword sourcing. A user of the technology described herein, denoted as a host, can use the Keyword Sourcing Module 322 to collect an initial unfiltered set of keywords from various sources. The following are some examples of important keyword sources that can be used. It will be apparent to those of ordinary skill in the art that other sources of keywords can similarly be used. Also note that there may likely be additional keyword sources that are important to various companies, organizations, countries or regions.

Internal—Host individually
    Host search query strings
    Host searches
    Host listing parsings
    Host catalogue listings
    Add a combination module as a list expansion tool (for instance have a list of action keywords (buy, cheap etc.)), then match it to a give category, or combine keywords from different sources
  Internal—Host combined with $3^{rd}$ parties
    Affiliate query strings
    Natural search query strings
    International keywords
    Paid Search query strings
    Keywords from other affiliated sites
  External: (Well known sources of keywords, e.g.)
    Googspy
    Yahoo buzz
  Ad Hoc
    Generic User Upload utility for ad hoc keyword list additions
    "Keyword blender" which takes existing keyword strings and recombines the words into new keyword strings.
    Duplicate keywords may be allowed on Google if they have different Match Types as is currently available through the well-known Google interface.

Pre-Aggregation Scrubbing Module (Scrubber)

Before a Keyword is loaded into the keyword storage 328, the Pre-Aggregation Scrubbing Module 324 filters or scrubs the initial set of keywords obtained by the sourcing module 322. One object of the scrubbing module 324 is to filter out undesirable keywords (or keyword parts) as keywords arrive to the KWDM 320 through sourcing module 322 from multiple, disparate data sources. The scrubber has country specific configuration parameters which govern both the rules and order of the rules to execute and the rule specific parameters which govern which special characters are removed from each country's keywords, for example.

Generally, keywords may be transformed (scrubbed) according to various principles:

- General keyword normalization (maximum length, excess white space, maximum word count, case, etc.)
- The removal of undesirable or disallowed characters (e.g. special characters) and undesirable words (e.g. NIB)
- The removal of undesirable or disallowed keywords or keyword-parts (host-general and partner-specific black lists)
- Vetting against a site-specific whitelist which allows words to pass through the scrubber untouched The general objectives behind the keyword scrubbing are:

- To avoid trafficking keywords which are—for one reason or another—undesirable to the host (e.g., trademark-infringing, indicators to host policy violations, etc.)
- To minimize overhead in attempting to traffic keywords, which would ultimately be rejected by one or more search partner.

In one embodiment, there may be three potential levels of scrubbing: full scrub, basic scrub, and no scrub. Via a configuration setting, a user can select the level of scrubbing appropriate for each keyword source. The multi-tiered scrubbing of one embodiment allows someone to add a key phrase, "sex in the city", without the phrase being automatically converted to "sex city". In one embodiment, the default setting may be "basic scrub". The "no scrub" option would probably not be a good default setting as this option accepts non-alphanumeric characters and therefore may hamper the usefulness of the aggregator 326. It may be noted that the scrubbing process performed by the scrubber 324 is distinct from the filtering done when the keyword is trafficked. The basic scrub options of one embodiment are described below.

- Full scrub—user specifies these characters and words. Most likely, non-alphanumeric characters and stop words (e.g.: to, for, in, the, etc.) may be removed.
- Normal scrub—user specifies these characters and words. Most likely, non-alphanumeric characters.
- No scrub—keyword is accepted as is, and converted to all lower-case.

In another embodiment, no facility is provided to adjust filtration thresholds (e.g., full scrub, medium scrub, etc.). In this case, keyword rule breakers (e.g., "sex in the city") can be retained via a White List, and the various scrub-level options may be unnecessary. Regardless of scrub level, all keywords received from the sourcing module 322 are typically converted to all lowercase, and the ordering of the words within the keyword is retained. In addition, there may be a basic "garbage detecting" filter that filters out clearly undesirable keywords. For instance, if scrubber 324 sees a keyword that has fifty characters and no spaces, scrubber 324 may delete this keyword entirely (assuming it is not purposefully a URL).

In one embodiment, the following operations may be performed by the scrubber 324.

a. Keyword Normalization

All keywords may be assumed to be normalized to lower case. This has two significant implications: 1) a host may assume its partners may always insulate the host from trafficking impact by treating upper/lower case keyword combinations equally; and 2) a host must be certain its trafficking application programming interface (API) and performance data processing/reporting are properly accounting for mixed case keywords (e.g., that numbers for "Golf Clubs" properly roll up to the numbers for "golf clubs").

Each keyword may contain no more than fifty characters.

Each keyword may be forced into lower case.

All non-alphanumeric keyword elements may be removed, with the exception of apostrophe (e.g., steve's ice cream is allowed), based on the country specific configuration parameters.

Excess white space may be removed (space, non-display characters, etc.)

Filter out "noise words" (may be exact match within a keyword phrase), which comprise the following component words: a, about, an, and, at, by, for, from, how, in, is, of, on, or, the, to, what, with. Again, this is a country specific configuration.

Truncate (after noise word filtration) keywords to the number of component words in the country specific word count configuration. Multi-word keywords may be rounded down to the nearest keyword.

All keywords may be logged into the "un-scrubbed keywords" table. Though various scrubbing and/or filtration measures may prevent a keyword from begin validated (and receiving an ID, being traffick-able, etc.), the host may retain the keyword in its original form in this table. Further, un-scrubbed keyword forms in the un-scrubbed table may be given a reference to the scrubbed (valid) keyword they spawned, where applicable.

b. Host Blacklist Filtration

A user-accessible (maintainable) keyword list per site may determine whether certain keywords are accepted as valid keywords in the KWDM 320. In a keyword blacklist, a newly received keyword that matches an entry on the blacklist may be rejected. In a keyword whitelist, a newly received keyword that matches an entry on the whitelist may be accepted.

The blacklist and the whitelist (generally denoted keyword filtration) may support a wildcard mechanism, preferably via a match type indicator for broad and exact match. In the context of a broad match, one embodiment can differentiate between a substring broad match and a word broad match, e.g., a simple broad match on "gucci" might blacklist "gucci handbag" and "bob guccione", whereas a word broad match might only blacklist "gucci hand bag", as this is the only entry that matches "gucci" as a word.

c. Partner Blacklist Filtration

A user-accessible (maintainable) keyword list by partner and site may determine whether certain keywords are accepted as valid keywords in the KWDM 320.

The wildcard mechanism and broad match features described above may apply at the partner level as well.

d. User Whitelist

Certain keywords for a given site (e.g., "sex in the city" on site xyz) may have a permanent home in the KWDM 320, and it may be necessary to define this list, and provide a means for the users to update and amend it. It is not so much the intent of the whitelist to preclude items from being inadvertently or overzealously being scrubbed (because by putting them on the whitelist we already know they are valid keywords)—rather, the intent is to ensure we are capturing the latest sourcing data for these keywords (so that the blacklist is preventing this valuable "freshness" data from hitting these keywords). In short, prior to actually blacklisting a given keyword at the site or site-partner level, it may first be cross-referenced against the whitelist. If the keyword is found in the whitelist, the most recent sourcing data may be tagged to the keyword. In one embodiment, the match type from the whitelist may be assumed to be exact. In the computer-implemented method and system, there is interplay between the black and white lists. Black lists are useful to remove keywords that are offensive, illegal, or clearly objectionable. However, it may be that a black list entry may cause undesired filtration. For example, it may be desired to retain the keyword, "Thomas Crapper". However this keyword may be rejected as containing an offensive word. The computer-implemented method and system provide the functionality to use the white list to correct these undesired filtrations. In this example, the keyword, "Thomas Crapper" could be added to the white list to ensure that the keyword was not rejected by the black list. As such, the blacklist and the white list interact to create a precise level of filtration. The computer-implemented method and system provide configurable white lists and black lists so new terms can be quickly added or removed from either list. In addition, the keywords rejected from the black list can be reviewed and immediately added to the white list if a desired keyword is erroneously rejected.

e. Partner API Scrubbing

Yahoo! (e.g. Yahoo! Canonical Form API Scrubbing) normalizes the search terms submitted to them. In order to provide a greater degree of synchronicity, and to minimize trafficking overhead, a host can access the Yahoo! Canonical Forms API to produce and store the Yahoo variant of any given keyword as part of the KWDM scrubbing methodology. e.g., to Yahoo, "dogs" is simply "dog". Note that this step regulates which keywords (and what forms of those keywords) are stored at the partner->keyword level, e.g., in the case above, while "dog" and "dogs" might be stored for Google, only the "dog" variant would be stored for Yahoo. Because of the above feature, it is not necessary to store the post-scrub non-canonical form of the keyword at the partner->keyword level. If necessary, it may be possible to back into the original, un-scrubbed keyword form, but transparency at this intermediate layer may be lost.

Figure 4:
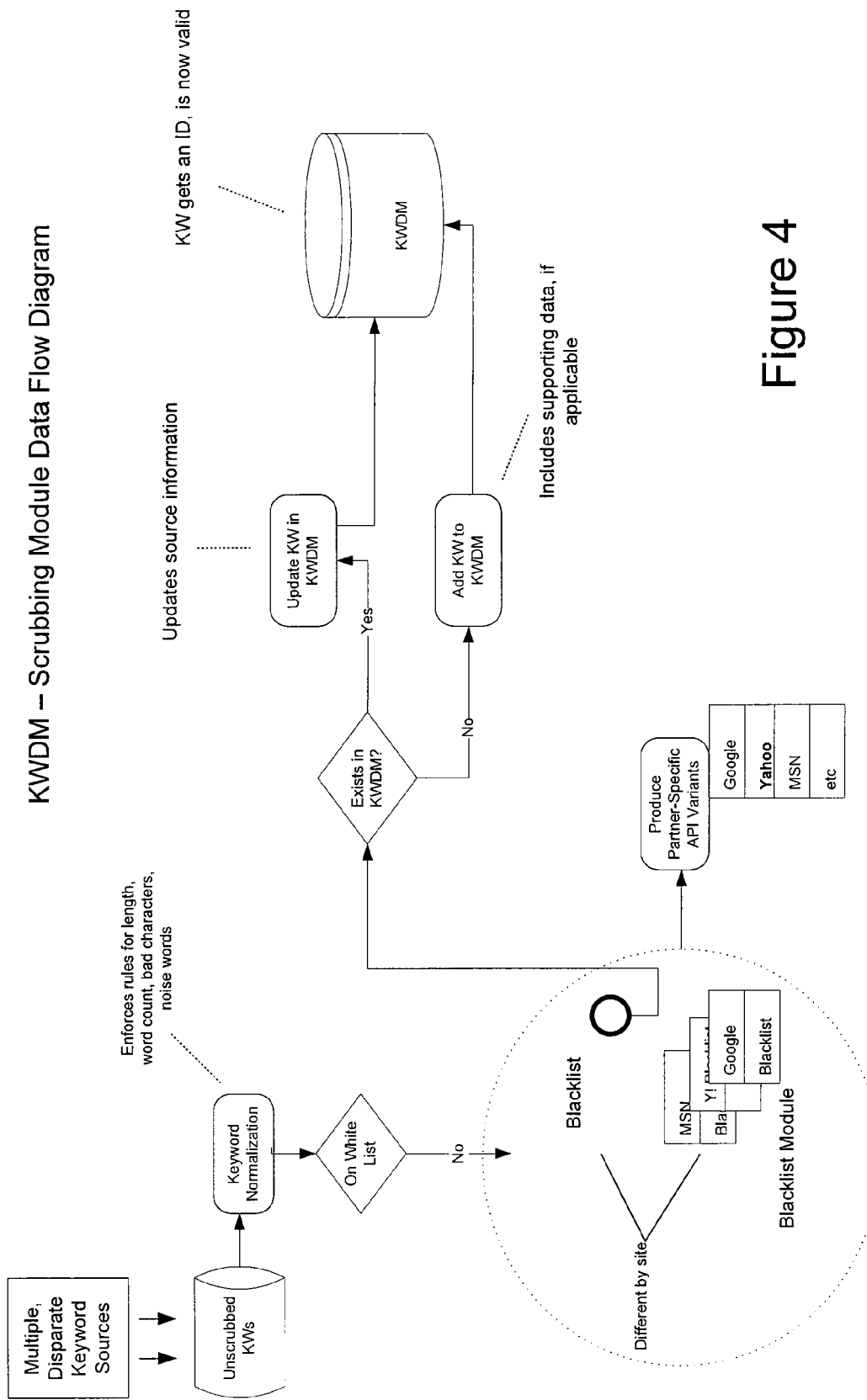
FIG. 4 illustrates the structure and flow of the keyword scrubbing module of one embodiment.

FIG. 4 illustrates the processing flow of the operations performed by the scrubber 324 in an example embodiment. Once a keyword arrives via the sourcing module 322, the keyword is stored, along with any contextual data provided by its source, in the KWDM 320 as an "un-scrubbed" keyword. A batch process targets all new arrivals, whether or not their scrubbed variants already exist as keywords in the KWDM 320 and runs the new keywords through each of the scrubber 324 operations described above. If a keyword is new and is not rejected by the operations of the scrubber 324, the keyword is added to the KWDM keyword storage 328 along with its sourcing data. If the keyword already existed in the KWDM 320, only the sourcing data is updated.

Keyword Data Aggregation Module (Aggregator)

Keywords in the KWDM 320 may contain various levels of dimension data. For example: 1) global dimensions (e.g. linguistic dimensions), 2) traffic dimensions (internal and external data), 3) clustering dimensions, and 4) source specific metrics. These dimensions are described in more detail below. Because many of these dimensions change from day to day, the aggregator 326 defines a time period of measurement for each metric. It may not be necessary to repopulate all of these metrics every day for every keyword. A weekly, monthly or quarterly refresh may be sufficient in some cases.

A mechanism to track the source (and number of occurrences per source) by keyword is also a desired feature. As examples of dimensions (non-exhaustive):

a. Global Dimensions
   component words
   number of words
   "fingerprint": the keyword's words sorted alphabetically, so that "ipod mini" and "mini ipod" would map to the same fingerprint—this may be used to generate simple linguistic matches
   Categorization: the propensity of a given keyword to belong to each host site category in the category hierarchy (e.g. product grouping)
   Part of Speech (noun, verb, adjective, etc)
   Similar to part of speech—action words (e.g. buy, sell, etc.)—allows for keyword combinations
   linguistic affinity matching (e.g. a score for keyword pairs which indicates their "likeness" based on the words they share)
   Predicted Revenue per Click (RPC) (from "best available" RPC model)
   number of host search results
   number of searches on yahoo in a time period
   Purged/Tested status flag b. Traffic Dimensions
   Trafficked on Search Engine xyz
   Sourced from Site abc
   By Search Engine
      Current Cost per Click (CPC) (bid) (if trafficked)
      Avg. CPC (last 30 days)
      Avg. Position (last 30 days)
      Cost
      Revenue
      Clicks
      Impressions
      Bids
      Confirmed Registered Users (CRU)
      Active Confirmed Registered Users (ACRU)
   Host Search Volume c. Clustering Dimensions
   Category Affinity (potentially multiple approaches)
   Value for Confirmed Registered User (VCRU) by keyword
   Revenue per Click (RPC) Predictive Model Score
      Predicted RPC
      Predicted Clicks
   Creative/Landing Page Cluster
   Metrics as required to support clustering
      User Metrics
      Category Metrics d. Source-Specific Dimensions (extensible)
   Affiliate queries
      Affiliate ID
   International
      Country
      Revenue
      Clicks
   Natural search
      Revenue
      Cost
   Host searches
      number of queries in prior unit of time
      number of bids resulting from word
      number of listings resulting from word
      number of registrations resulting from word
      number of watches resulting from word
      Revenue resulting from word Query String map
Map of query strings which have been seen associated with keyword strings in paid search data Referring to FIG. 5, an example of the metrics processed by aggregator 326 is illustrated. Because many of these statistics change from day to day, the aggregator 326 documents from what period of time the statistic is taken. It may not be necessary to repopulate all of these statistics every day. A monthly or quarterly refresh may be sufficient. For statistics involving the actual cost and revenue for the trafficked word for the host, the aggregator 326 incorporates new data with the old data. If a keyword comes in more than once from the same source, the aggregator 326 can increment the number in the appropriate source column. If the keyword is seen from a new source, the aggregator 326 increments the relevant source column.

Keyword Selection Module (Selector)

The Keyword Selection Module 330 is shown in FIG. 3. In one embodiment, there are two ways to select keywords to be added: manually and automatically.

Manual Method

The user can run ad hoc queries on any of the fields to retrieve any set of keywords. Standard logic is supported (e.g. and, or's, joins, etc.).

The user can sort according to any of the fields in the aggregator 326.

The user can export the query result

The user can create a list with the query results which can then be used to bid that group of keywords in a like manner The user can save query parameters Automatic Method The user can specify which metrics have been deemed to be useful predictors for valuable keywords (via heuristic testing or based on external models), and the keyword testing complex 310 then uses these criteria to automatically select keywords to be trafficked. This query can be generated by a configurable set of criteria that can be pre-set and executed at regular intervals.

Any other metric tracked by the aggregator 326 can be available as an input into the automatic keyword selector 330.

Keyword Pruning Module

Many keywords draw a lot of clicks with few ROI events (e.g. bids/CRUs). For example, many keywords may have a calculated RPC below an established minimum threshold level of a cost per click (CPC). In most cases, these keywords can be pruned (e.g. removed or rejected for retention in the KWDM) or paused. In one embodiment, keywords with expected (RPC)<min(CPC) are pruned/paused. The Keyword Pruning Module 340 is an application wherein a user can specify criteria and generate lists of keywords to be untrafficked based on that list. In one embodiment, the user can prune keywords in two ways: manually and automatically.

Manual Method

The user can upload a list of keywords to be untrafficked. Alternatively, the user can run a query and select the keywords to be untrafficked.

Automatic Method

The user can specify the metrics and thresholds to be used for automatic ongoing prunes. In one embodiment, there is a safety valve in the case that someone's pruning metrics are too aggressive. The Pruner 340 may generate a report every week (or other time period) which shows the keywords that meet the pruning profile, and the loss in revenue and cost if the keywords are pruned. The user may then approve the keywords to be pruned and any exceptions to this (e.g. keywords to be kept). A configurable threshold confidence level for keyword pruning can be defined. Then, on a periodic basis (again configurable), each keyword is compared to see if a statistically significant conclusion can be reached based on the confidence level. For example, if it is determined that with an 80% confidence level that the expected RPC is below the minimum CPC, that keyword may be pruned from the keyword portfolio.

One key to success in automatic pruning is to balance immediacy or urgency of pruning with statistical significance. "Check-Point" methodology provides the optimal solutions: build robust models to predict the propensity of keywords being unprofitable at each of the check-points, and re-score the keywords on a periodic basis (e.g. daily) incorporating the newest information.

In addition to facilitate deleting or pausing unprofitable keywords in a timely manner, the pruning predictive models and related scores provide a valid and accurate tool to improve revenue prediction models, especially for those non-high volume keywords.

Referring now to FIG. 1, a diagram illustrates the network environment in which an example embodiment may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 2A:
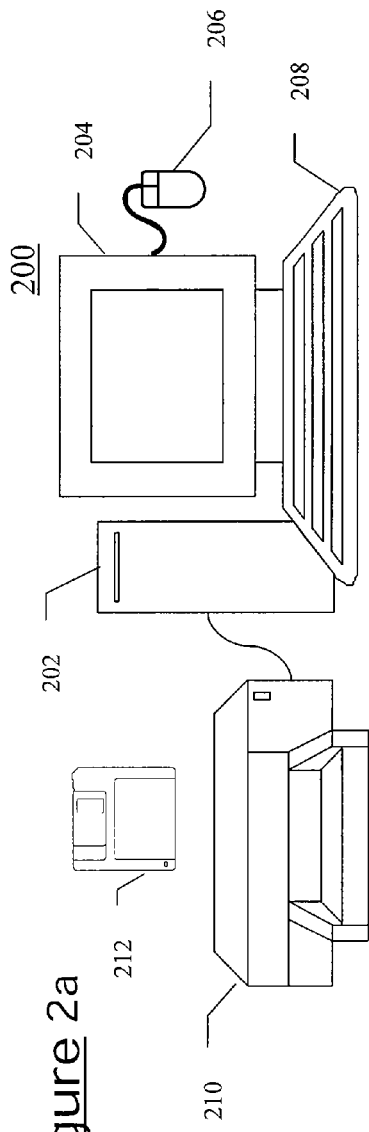
FIGS. 2a and 2b are a block diagram of a computer system on which an embodiment may operate.
Figure 2B:
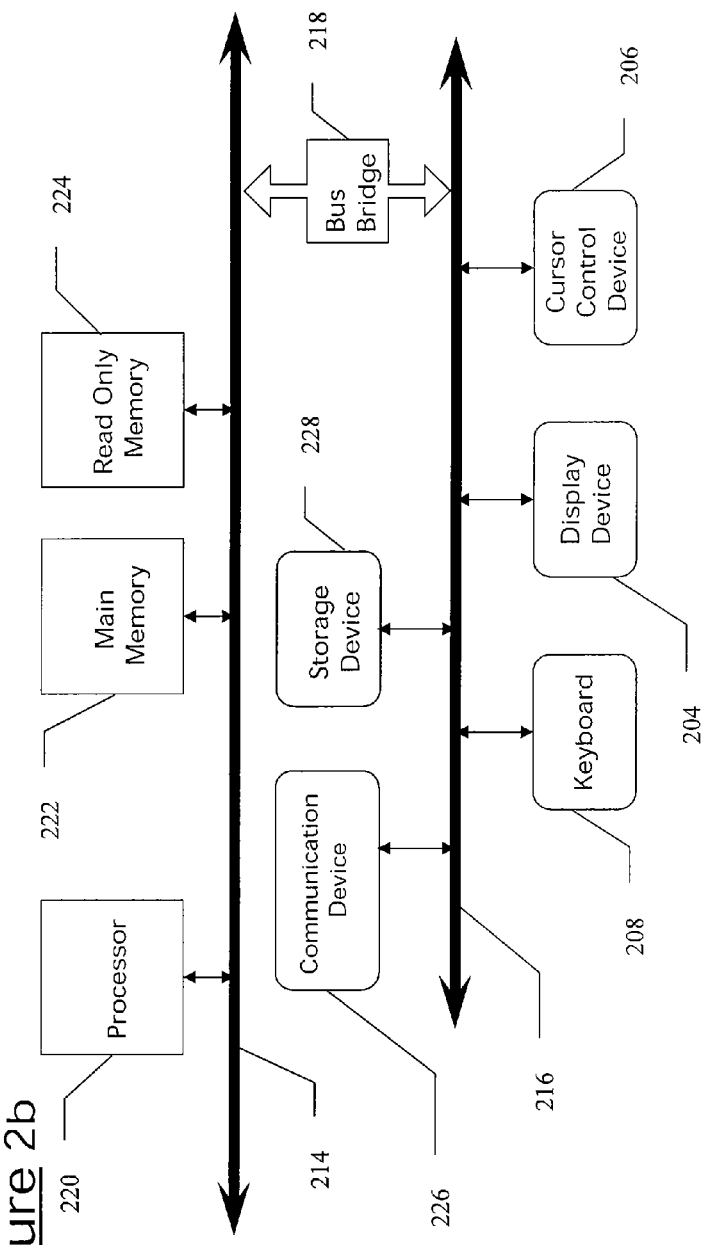

Having briefly described one embodiment of the network environment in which an example embodiment may operate, FIGS. 2a and 2b show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The system of an example embodiment includes software, information processing hardware, and various processing steps, which will be described below. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of user interface presentations may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented method and system for enabling the automated selection of keywords for rapid keyword portfolio expansion are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A computer-implemented method comprising:
normalizing a plurality of keywords received from a source, the source being from the group: a search query and a product listing;
filtering the normalized plurality of keywords against one or more keyword filtration lists;
producing site-specific variants of the filtered plurality of keywords;
associating a plurality of levels of dimension data with each of the plurality of keywords, the plurality of levels of dimension data including information indicative of a probability that a keyword of the plurality of keywords belongs to a particular product category in a product category hierarchy, the plurality of levels of dimension data including keyword clustering dimension data, the keyword clustering dimension data including information indicative of a probability that a keyword of the plurality of keywords belongs to a particular keyword cluster of a plurality of pre-defined keyword clusters, the plurality of levels of dimension data including keyword traffic dimension data, the keyword traffic dimension data including information indicative of a probability that a keyword of the plurality of keywords was trafficked by a particular search engine, wherein the probability that a keyword of the plurality of keywords was trafficked by a particular search engine is maintained for each of a plurality of search engines, the keyword traffic dimension data including information indicative of a probability that a keyword of the plurality of keywords will achieve a predicted revenue per click level, the keyword traffic dimension data including information indicative of a value related to confirmed registered users, the keyword traffic dimension data including information indicative of a landing page related to a particular cluster of keywords;
defining a time period of measurement for a metric corresponding to the plurality of levels of dimension data; and storing the processed plurality of keywords and dimension data in a keyword database, and selecting at least one keyword from the stored processed plurality of keywords according to the dimension data in the keyword database.

2. The method as claimed in claim 1 wherein the one or more keyword filtration lists includes a blacklist.

3. The method as claimed in claim 1 wherein the one or more keyword filtration lists includes a whitelist.

4. The method as claimed in claim 1 wherein the site-specific variants of the filtered plurality of keywords are based on a site-specific canonical form application programming interface.

5. The method as claimed in claim 1 wherein the selecting at least one keyword from the stored processed plurality of keywords according to dimension data in the keyword database comprises submitting a bid price for the at least one selected keyword.

6. The method as claimed in claim 1 wherein the plurality of levels of dimension data includes keyword source-specific dimension data.

7. The method as claimed in claim 1 further including associating with a keyword prediction criteria useful to predict keywords that are likely to be valuable.

8. The method as claimed in claim 1 further including pruning keywords from the keyword database that are not likely to be valuable.

9. An article of manufacture comprising at least one data storage device having one or more computer programs stored thereon and operable on one or more computing systems to:
 normalize a plurality of keywords received from a source, the source being from the group: a search query and a product listing;
 filter the normalized plurality of keywords against one or more keyword filtration lists;
 produce site-specific variants of the filtered plurality of keywords;
 associate a plurality of levels of dimension data with each of the plurality of keywords, the plurality of levels of dimension data including information indicative of a probability that a keyword of the plurality of keywords belongs to a particular product category in a product category hierarchy, the plurality of levels of dimension data including keyword clustering dimension data, the keyword clustering dimension data including information indicative of a probability that a keyword of the plurality of keywords belongs to a particular keyword cluster of a plurality of pre-defined keyword clusters, the plurality of levels of dimension data including keyword traffic dimension data, the keyword traffic dimension data including information indicative of a probability that a keyword of the plurality of keywords was trafficked by a particular search engine, wherein the probability that a keyword of the plurality of keywords was trafficked by a particular search engine is maintained for each of a plurality of search engines, the keyword traffic dimension data including information indicative of a probability that a keyword of the plurality of keywords will achieve a predicted revenue per click level, the keyword traffic dimension data including information indicative of a value related to confirmed registered users, the keyword traffic dimension data including information indicative of a landing page related to a particular cluster of keywords;
 define a time period of measurement for a metric corresponding to the plurality of levels of dimension data; and
 store the processed plurality of keywords and dimension data in a keyword database and select at least one keyword from the stored processed plurality of keywords according to the dimension data in the keyword database.

10. The article of manufacture as claimed in claim 9 wherein the one or more keyword filtration lists includes a blacklist.

11. The article of manufacture as claimed in claim 9 wherein the one or more keyword filtration lists includes a whitelist.

12. The article of manufacture as claimed in claim 9 wherein the site-specific variants of the filtered plurality of keywords are based on a site-specific canonical form application programming interface.

13. The article of manufacture as claimed in claim 9 wherein the selecting at least one keyword from the stored processed plurality of keywords according to dimension data in the keyword database comprises submitting a bid price for the at least one selected keyword.

14. The article of manufacture as claimed in claim 9 wherein the plurality of levels of dimension data includes keyword source-specific dimension data.

15. The article of manufacture as claimed in claim 9 being further operable to associate with a keyword prediction criteria useful to predict keywords that are likely to be valuable.

16. The article of manufacture as claimed in claim 9 being further operable to prune keywords from the keyword database that are not likely to be valuable.

17. A system comprising:
 a processor;
 a memory coupled to the processor to store information related to keywords; and
 a keyword selection module, operably coupled with the processor and the memory, operable to normalize a plurality of keywords received from a source, the source being from the group: a search query and a product listing, filter the normalized plurality of keywords against one or more keyword filtration lists, produce site-specific variants of the filtered plurality of keywords, associate a plurality of levels of dimension data with each of the plurality of keywords, the plurality of levels of dimension data including information indicative of a probability that a keyword of the plurality of keywords belongs to a particular product category in a product category hierarchy, the plurality of levels of dimension data including keyword clustering dimension data, the keyword clustering dimension data including information indicative of a probability that a keyword of the plurality of keywords belongs to a particular keyword cluster of a plurality of pre-defined keyword clusters, the plurality of levels of dimension data including keyword traffic dimension data, the keyword traffic dimension data including information indicative of a probability that a keyword of the plurality of keywords was trafficked by a particular search engine, wherein the probability that a keyword of the plurality of keywords was trafficked by a particular search engine is maintained for each of a plurality of search engines, the keyword traffic dimension data including information indicative of a probability that a keyword of the plurality of keywords will achieve a predicted revenue per click level, the keyword traffic dimension data including information indicative of a value related to confirmed registered users, the keyword traffic dimension data including information indicative of a landing page related to a particular cluster of keywords, define a time period of measurement for a metric corresponding to the plurality of levels of dimension data, and store the processed plurality of keywords and dimension data in a keyword database, and select at least one keyword from the stored processed plurality of keywords according to the dimension data in the keyword database.

18. The system as claimed in claim 17 wherein the one or more keyword filtration lists includes a blacklist.

19. The system as claimed in claim 17 wherein the one or more keyword filtration lists includes a whitelist.

20. The system as claimed in claim 17 wherein the site-specific variants of the filtered plurality of keywords are based on a site-specific canonical form application programming interface.

21. The system as claimed in claim 17 wherein the selecting at least one keyword from the stored processed plurality of keywords according to dimension data in the keyword database comprises submitting a bid price for the at least one selected keyword.

22. The system as claimed in claim 17 wherein the plurality of levels of dimension data includes keyword source-specific dimension data.

23. The system as claimed in claim 17 being further operable to associate with a keyword prediction criteria useful to predict keywords that are likely to be valuable.

24. The system as claimed in claim 17 being further operable to prune keywords from the keyword database that are not likely to be valuable.

* * * * *